United States Patent
Inge et al.

(10) Patent No.: US 10,118,184 B2
(45) Date of Patent: Nov. 6, 2018

(54) CENTRIFUGAL SEPARATOR CONICAL ROTOR DISC ELEMENTS HAVING RADIAL PROJECTIONS, AND ROTORS HAVING DISC ELEMENTS

(71) Applicant: 3NINE AB, Nacka Strand (SE)

(72) Inventors: Claes Inge, Nacka (SE); Peter Franzén, Bandhagen (SE)

(73) Assignee: 3NINE AB (SE)

( * ) Notice: Subject to any disclaimer, the term of this patent is extended or adjusted under 35 U.S.C. 154(b) by 895 days.

(21) Appl. No.: 14/397,103

(22) PCT Filed: Mar. 18, 2013

(86) PCT No.: PCT/SE2013/050290
§ 371 (c)(1),
(2) Date: Oct. 24, 2014

(87) PCT Pub. No.: WO2013/162443
PCT Pub. Date: Oct. 31, 2013

(65) Prior Publication Data
US 2015/0119225 A1 Apr. 30, 2015

(30) Foreign Application Priority Data

Apr. 23, 2012 (SE) ...................... 1250403

(51) Int. Cl.
*B04B 7/14* (2006.01)
*B04B 1/08* (2006.01)
(Continued)

(52) U.S. Cl.
CPC ............... *B04B 7/14* (2013.01); *B01D 45/14* (2013.01); *B04B 1/08* (2013.01); *B04B 5/12* (2013.01); *B04B 2005/125* (2013.01)

(58) Field of Classification Search
CPC ....... B04B 5/12; B04B 2005/125; B04B 1/08; B04B 7/14; B01D 45/14
(Continued)

(56) References Cited

U.S. PATENT DOCUMENTS 3,335,946 A * 8/1967 Putterlik .................. B04B 7/14
494/73
4,036,429 A * 7/1977 Ivin .......................... B04B 1/08
494/73
(Continued)

FOREIGN PATENT DOCUMENTS

EP 0 320 105 6/1989
FR 2 390 210 8/1978
WO WO-2013162443 A1 * 10/2013 ............... B04B 5/12

OTHER PUBLICATIONS

International Search Report for corresponding PCT/SE2013/050290, completed Jul. 5, 2013 by Michiel Desittere of the EPO.
(Continued)

*Primary Examiner* — Charles Cooley
(74) *Attorney, Agent, or Firm* — Tarolli, Sundheim, Covell & Tummino LLP

(57) ABSTRACT

Conical disc element (22) for a rotor of centrifugal separators, wherein the disc element has a plurality of projections (36) protruding radially outwardly or inwardly from an outer or an inner peripheral edge (28, 26), respectively, of the disc element, and rotors assembled from such disc elements.

14 Claims, 4 Drawing Sheets

(51) Int. Cl.
  *B01D 45/14* (2006.01)
  *B04B 5/12* (2006.01)
(58) Field of Classification Search
  USPC .................................................. 494/68–73
  See application file for complete search history.

(56) References Cited

U.S. PATENT DOCUMENTS

| | | | |
|---|---|---|---|
| 4,142,671 A * | 3/1979 | Ivin ........................ | B04B 1/08 |
| | | | 494/73 |
| 4,262,841 A | 4/1981 | Berber et al. | |
| 5,637,217 A * | 6/1997 | Herman .................. | B04B 1/08 |
| | | | 184/6.24 |
| 5,795,477 A | 8/1998 | Herman et al. | |
| 2015/0119225 A1* | 4/2015 | Inge ........................ | B04B 5/12 |
| | | | 494/70 |
| 2015/0126353 A1* | 5/2015 | Hagqvist .................. | B04B 1/08 |
| | | | 494/72 |
| 2016/0001302 A1* | 1/2016 | Quiter ..................... | B04B 1/08 |
| | | | 494/73 |

OTHER PUBLICATIONS

Swedish Search Report for corresponding SE1250403-1, completed Jan. 10, 2012 by Katarina Ekman of the ISA/SE.

* cited by examiner

CENTRIFUGAL SEPARATOR CONICAL ROTOR DISC ELEMENTS HAVING RADIAL PROJECTIONS, AND ROTORS HAVING DISC ELEMENTS

RELATED APPLICATIONS

The present invention is a U.S. National Stage under 35 USC 371 patent application, claiming priority to Serial No. PCT/SE2013/050290, filed on 18 Mar. 2013; which claims priority from SE 1250403-1, filed 23 Apr. 2012, the entirety of both of which are incorporated herein by reference.

TECHNICAL FIELD

The present invention relates to a conical rotor disc element for centrifugal separators for cleaning of a gaseous fluid, with an inner surface facing the axial center axis of the conical disc element and with an outer surface facing away from the axial center axis of the disc element, and with spacing members on at least one of these surfaces for maintaining a mutual distance to an adjacent disc element, said disc element having a radially inner peripheral edge and a radially outer peripheral edge, wherein said spacing members have the shape of circumferentially distributed ribs extending between the peripheral edges and delimiting between them flow channels for a gaseous fluid to be cleaned.

BACKGROUND OF THE INVENTION

In centrifugal separators for cleaning of gaseous fluids, wherein the conical disc elements of the rotor have a relatively small difference in radius between their outer and inner peripheries, i.e. where the flow distance of the fluid through the channels between the disc elements is relatively short, the fluid has a tendency to create flow disturbances when entering rotating, radial flow channels between the disc elements, which affects the effective separation ability of the channels. Such disturbances can have the form of sub pressure zones created behind the radial ribs forming the channels between the disc elements, whereby the sedimentation area for the particles of the gaseous fluid is reduced substantially as is the separation capacity.

SUMMARY OF THE INVENTION

An object of the present invention is to harmonize the gas flow through the flow channels between the disc elements such that the flow through the channels is uniform and substantially free from disturbances in order to fully utilize the sedimentation areas of the disc elements.

According to a first aspect of the present invention this is achieved in conical disc elements for a rotor of a counter-current centrifugal separator, i.e. where the gas flow in said channels is directed into the center of the rotor, in that the disc element has a plurality of radial projections extending from the outer periphery thereof, said projections being configured such that several thereof are located between adjacent ribs, as viewed in the circumferential direction of the disc elements. Hereby, by spinning-up the gas by means of the many narrowly spaced projections the gas flow can be brought to flow essentially radially and uniformly all the way through the channels so that the sedimentation area of the disc elements can be utilized in a more effective manner in order to increase the separation capacity of the separator.

In conical disc elements of the invention for a rotor of a co-current centrifugal separator, i.e. where the gas flow in the flow channels is directed radially outwardly through the rotor, each disc element has, in correspondence with the former embodiment, a plurality of projections, but now inwardly extending from the inner periphery of the disc. The advantages are the same as for the counter-current separator.

It is suitable to form the outer free end of the projections rounded which results in a good uniformity of the gas flow through the channels.

Preferably, in a counter-current version of the discs the projections have a first side lying in a plane with an axial normal co-axial to the center axis and connected to the inner surface of the disc element, and a second side which likewise lies in a plane with an axial normal and connected to the outer surface of the disc element, wherein the first side of the projections is configured to engage and be supported by the second side of the projections of an adjacent disc element. These sides should be parallel to each other. They could be planar, sloping and/or curved.

Preferably, the spacing members are, in a plan view, radially directed, and one of the projections is formed as a radial extension of each rib, whereas the remaining projections are located between the adjacent ribs.

The ribs are preferably arranged on the inner surface of the disc element.

The invention also relates to rotors of centrifugal separators, where the rotor is built-up of a rotor core onto which a plurality of conical disc elements are stacked with an inner surface facing the axial center axis of the conical disc element and with an outer surface facing away from the axial center axis of the disc element, and with spacing members on at least one of these surfaces for maintaining a mutual distance between adjacent disc elements of the rotor, said disc element having a radially inner peripheral edge and a radially outer peripheral edge, wherein said spacing members have the shape of circumferentially distributed ribs extending between the peripheral edges and delimiting between them flow channels for a gaseous fluid to be cleaned. In a counter-current version of the rotor, a plurality of parallel, rib-like formations extend substantially axially on the outer periphery of the stack of disc elements and several of them cross each flow channel between the disc elements, whereas in a co-current version of a rotor these formations extend in a corresponding manner on the inner periphery.

Alternatively, the rib-like formations may have the shape of a plurality of separate ribs or rods located in engagement with the outside or inside of the disc stack formed by the outer and inner peripheral edges, respectively, of the disc elements.

Preferably, the ribs or rods may have a rounded cross-profile to optimize the flow harmonization and thereby the sedimentation capability.

Further features and advantages of the invention will appear closer below with reference to the accompanying drawings and the appended claims.

DETAILED DESCRIPTION OF PREFERRED EMBODIMENTS OF THE INVENTION

Figure 1:
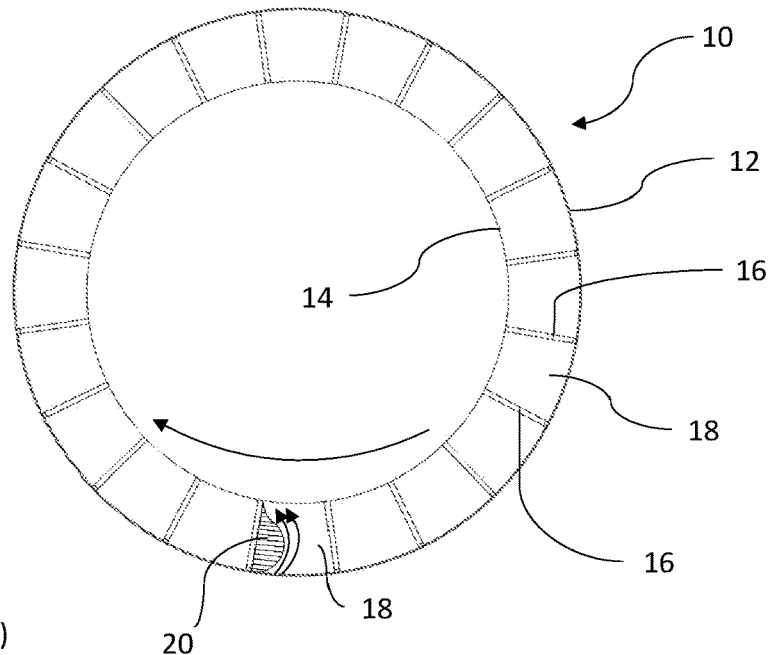
FIG. 1 schematically illustrates, in a plan view from below, a prior art conical disc element of a rotor for a centrifugal separator.

FIG. 1 schematically illustrates a previously known conical disc element 10 for a rotor of a counter-current centrifugal separator for cleaning of a gaseous fluid. The disc element 10 has an outer circular peripheral edge 12 and an inner circular peripheral edge 14 and a plurality of radial spacing members 16 which maintain a small distance between the disc elements 10 stacked upon one another in a rotor and defining between them radial, thin flow channels 18 for the gaseous fluid to be cleaned from particles in the channels 18. During rotation of a rotor, built-up of disc elements stacked upon one another, the gas fluid creates, upon entering the channels 18 (in the example of FIG. 1 from the outside radially inwardly in a counter-current flow manner) powerful sub pressure zones 20 at one side of the upstream end of the channels 18, which generates an inhomogeneous and a non-uniform gas flow through the channels 18 and therefore a reduced separation capability of the rotor. This is in particular the case with rotors, where the difference in outer and inner diameter of the disc elements 10 is relatively small, such as shown in FIG. 1.

Figure 2:
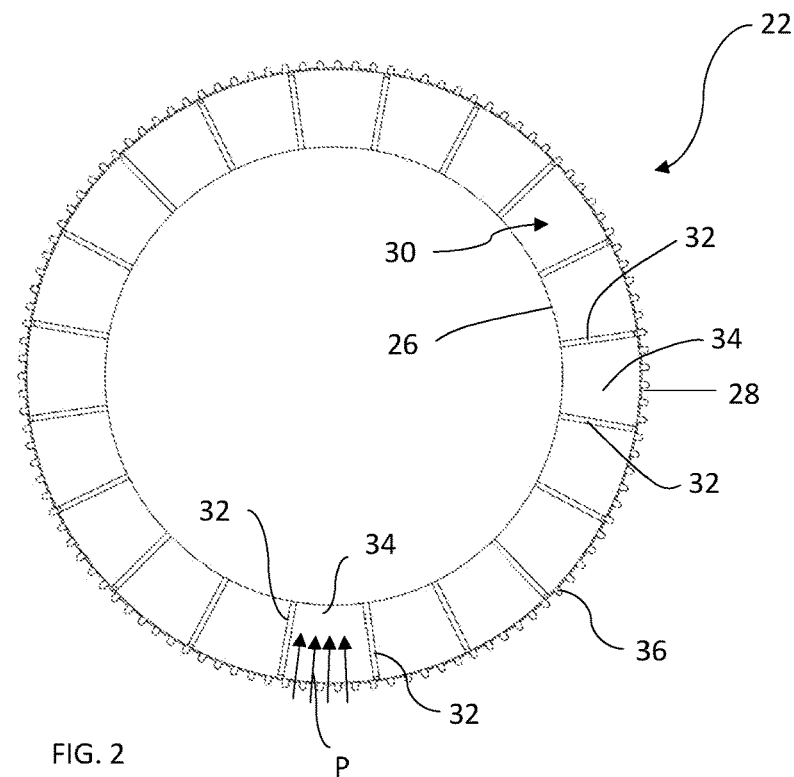
FIG. 2 schematically illustrates, in a plan view from below, a first embodiment of a conical disc element of the invention for a rotor of a counter-current centrifugal separator.
Figure 3:
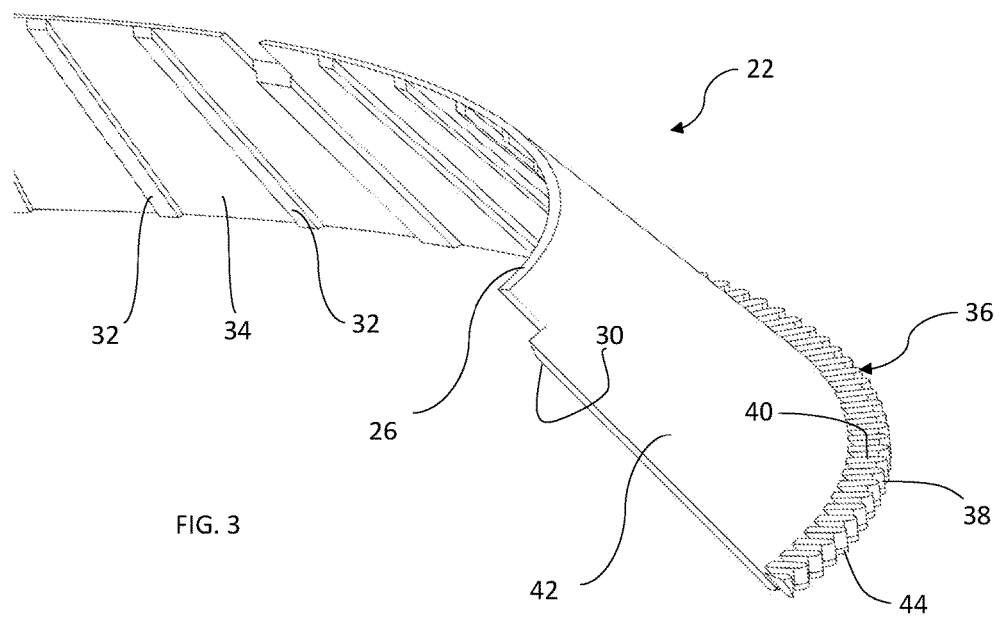
FIG. 3 is a cut-up perspective view of a disc element according to FIG. 2.

In FIGS. 2 and 3 a first embodiment of a disc element 22 of the invention is shown. The disc element 22 has a conical wall with an inner peripheral edge 26 and an outer peripheral edge 28 and, preferably on its inside 30 facing the center axis, a plurality of spacing members in form of radial ribs 32 for maintaining a mutual distance to adjacent disc elements 22 of a rotor of a centrifugal separator, where the ribs 32 also define between themselves radial flow channels 34 for the gaseous fluid to be cleaned. The outer peripheral edge 28 of each disc element 22 for a counter-current separator has a plurality tightly separated, radially outwardly extending lugs or projections 36. These projections 36 have, upon rotation of a rotor formed by such disc elements 22 stacked upon one another, a significant ability of creating a very uniform and homogeneous gas flow over the full length through the flow channels 34, as shown with arrows P in FIG. 2, which results in a more effective use of the available separation area in the channels 34 and in an increased separation capacity.

Figure 4:
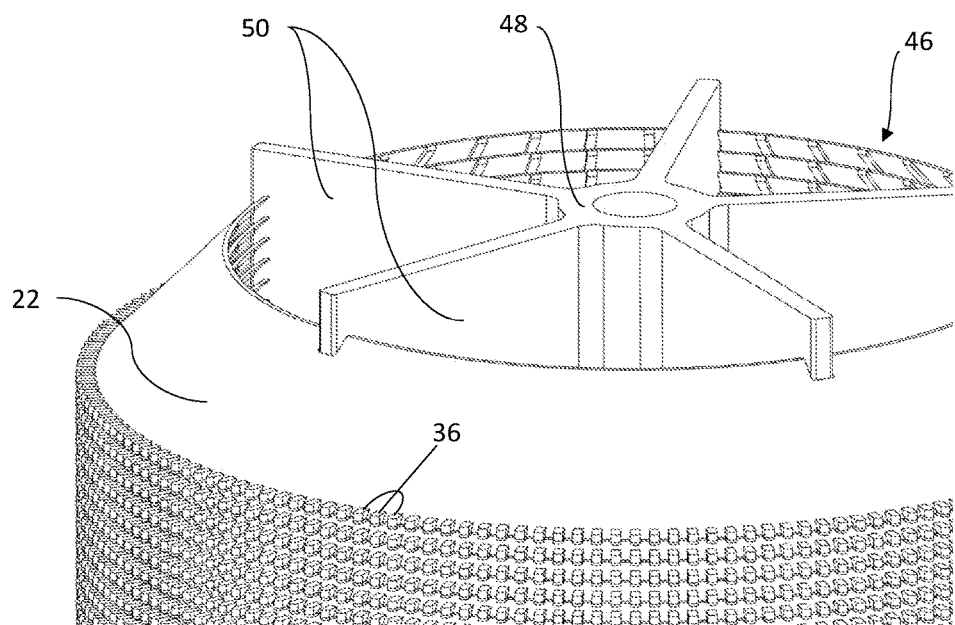
FIG. 4 is a perspective view of an out-cut portion of a rotor built up of a stack of disc elements in accordance with FIGS. 2 and 3.

As shown more closely in FIG. 3, the projections 36 have preferably a rounded outer end 38 and an upper planar side 40 which connects to the outer surface 42 of the disc element 22, and a lower planar side 44 which connects to the inside 30 of the disc element. The upper and lower sides 40 and 44 of the projections 36 are configured such that they are in a supporting engagement with each other in a stack of disc elements 22, as shown in FIG. 4, which illustrates a cut-out portion of a rotor 46 made of a plurality of disc elements 22 treaded on a rotor core 48 having radial spokes 50. Thus, the upper and lower sides 40, 44 of the projections 36 should be parallel. They could also be curved or sloping correspondingly as to the configuration such that they can engage each other in a supporting manner in a stack of disc elements.

Preferably, the projections 36 are evenly distributed circumferentially such that one of the projections 36 forms an extension of each rib 32, whereas the others are located between the adjacent ribs 32 (see FIG. 2).

Figure 5:
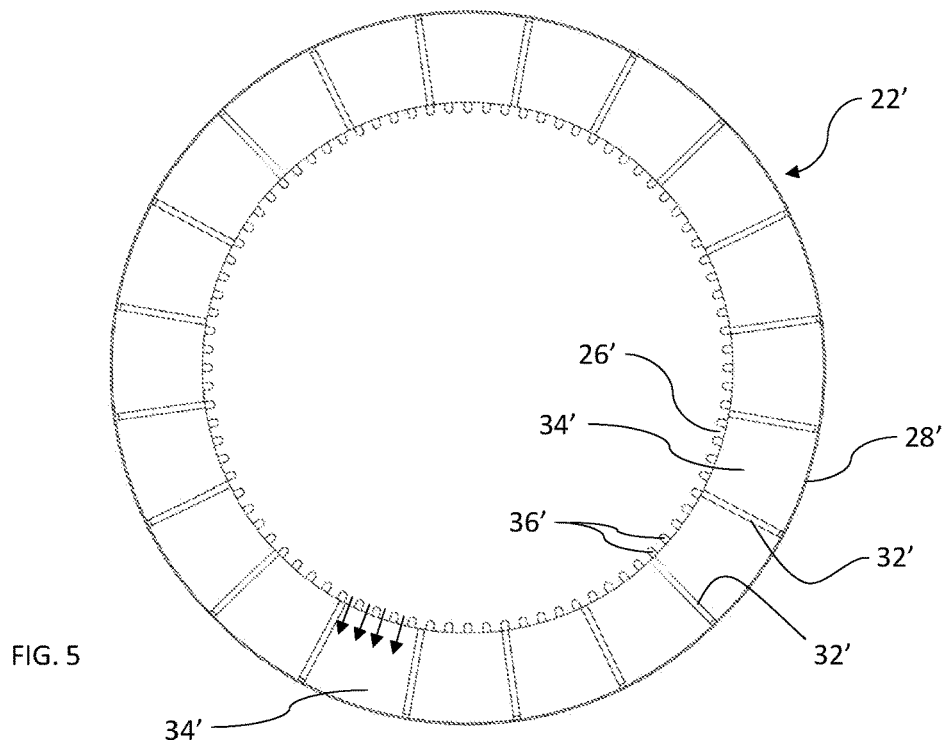
FIG. 5 is a view similar to FIG. 2 of a conical disc element of the invention for a rotor of a co-current centrifugal separator.

FIG. 5 illustrates a second embodiment of a disc element 22' of the invention for a rotor of a centrifugal separator operating according to the co-current principle. The disc element 22' is configured in an analogue manner with that of FIGS. 2-4, thus with a conical wall, an inner peripheral edge 26', an outer peripheral edge 28', spacing members 32' and flow channels 34', but instead the projections 36' are located along the inner peripheral edge 26' of the disc element 22'.

Figure 6:
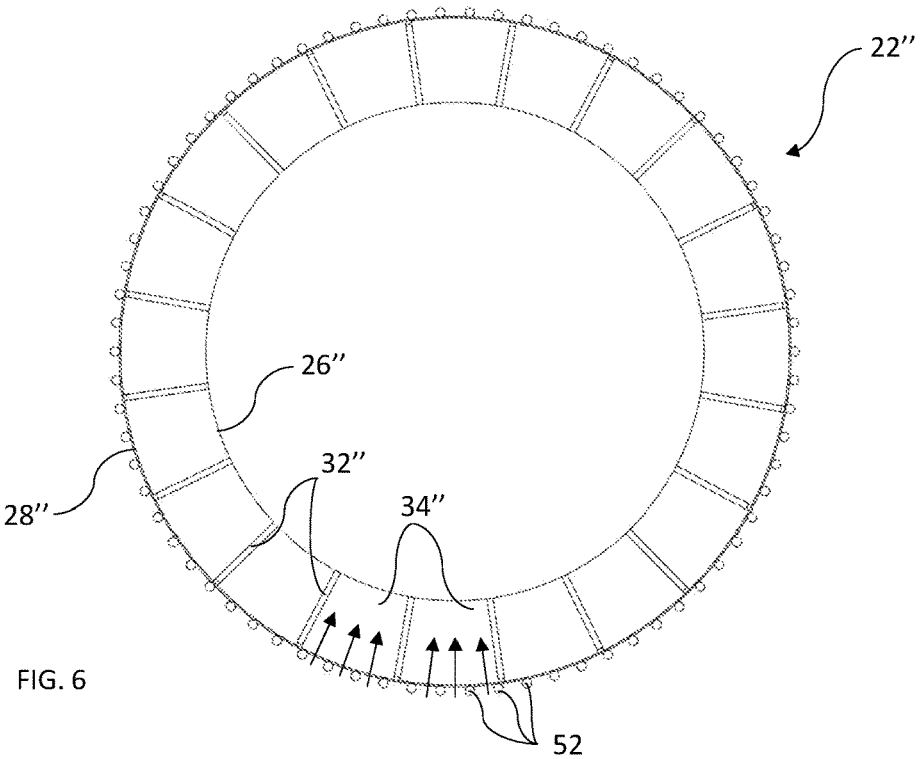
FIG. 6 illustrates schematically a cross-section through an alternative embodiment of a rotor of the invention for achieving an evenly distributed gas flow through the full length of the flow channels.
Figure 7A:
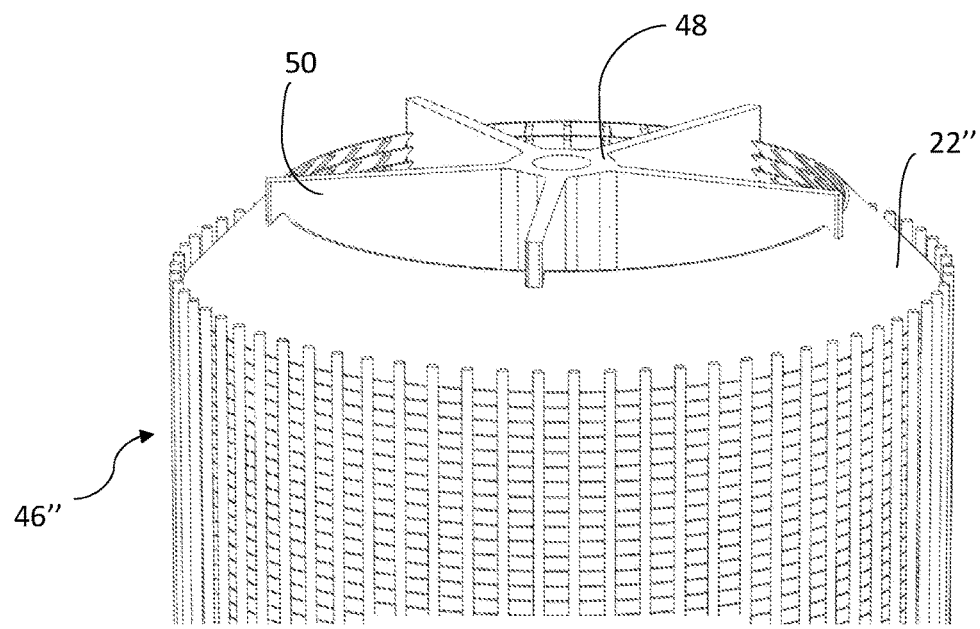
FIG. 7a is a perspective view of a portion of a rotor according to FIG. 6.

FIGS. 6 and 7a illustrate an alternative solution on how to obtain a homogeneous, uniformly distributed gas flow into and through radial flow channels 34" between ribs 32" of adjacent disc elements 22" of a rotor 46" of a centrifugal separator. Instead of using radial projections formed integrally with the disc elements of the rotor, such as in the embodiments of FIGS. 2-5, conventional disc elements 22' are stacked upon each other to form the rotor, onto which a great number of axially oriented, tightly spaced rod members 52 are attached which here perform the same function as the projections stacked upon one another in the previous embodiments. The embodiment of FIGS. 6 and 7a relates to a counter-current rotor 46". The rods 52 may be attached to each other in a manner similar to mats used for producing sushi rolls.

Figure 7B:
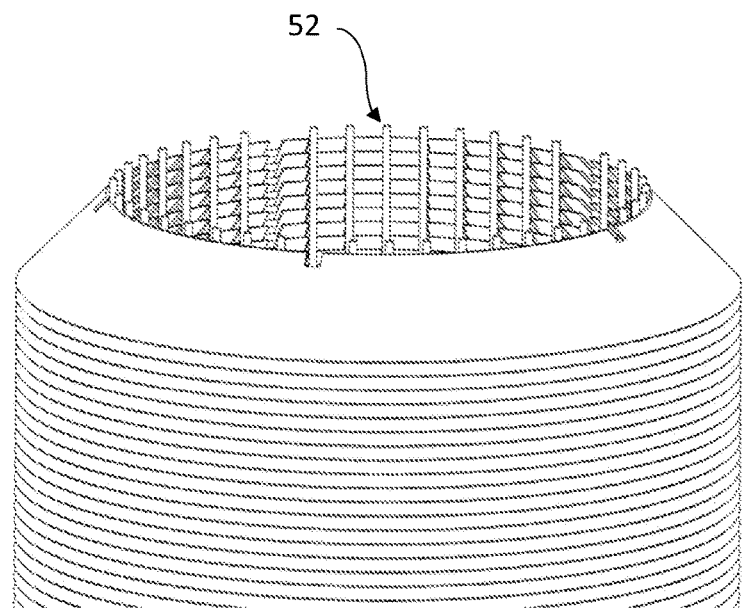
FIG. 7b is a perspective view of a portion of a rotor.

FIG. 7b illustrates a co-current version wherein the rods 52 may instead be attached to the inner peripheral surface of the stacked disc elements. The rod members 52 preferably have a round cross-profile.

The invention claimed is:

1. A conical disc element for a rotor of a centrifugal separator for cleaning of a gaseous fluid, the disc element comprising:
    an inner surface facing the axial center axis of the conical disc element;
    an outer surface facing away from the axial center axis of the disc element;
    a radially inner peripheral edge;
    a radially outer peripheral edge;
    spacing members on at least one of the inner and outer surfaces for maintaining a mutual distance to an adjacent disc element, the spacing members having the shape of circumferentially distributed ribs extending from the outer peripheral edge towards the inner peripheral edge and delimiting between them flow channels for a gaseous fluid to be cleaned; and
    a plurality of radial projections extending radially outwardly from the outer peripheral edge, said projections being configured such that several whole ones thereof are located between adjacent ribs, as viewed in the circumferential direction of the disc element.

2. The disc element according to claim 1, wherein the projections have a rounded free end.

3. The disc element according to claim 1, wherein the projections have a first side lying in a plane with an axial normal co-axial to the center axis and connected to the inner surface of the disc element, and a second side which likewise lies in a plane with an axial normal and connected to the outer surface of the disc element, wherein the first side of the projections is configured to be able to engage and be supported by the second side of the projections of an adjacent disc element.

4. The disc element according to claim 1, wherein the projections have first and second opposite sides which are planar, curved or sloping in a parallel manner to be able to engage each other in a stack of adjacent disc elements.

5. The disc element according to claim 4, wherein one of the projections is formed as an extension of each rib.

6. The disc element according to claim 4, wherein the ribs are formed on the inner surface of the disc element.

7. A method of using the disc element of claim 1 in forming of a rotor for a centrifugal separator for cleaning of a gaseous fluid, comprising the step of stacking a plurality of the disc elements onto a rotor core member.

8. A conical disc element for centrifugal separators for cleaning of a gaseous fluid, the disc element comprising:
   an inner surface facing the axial center axis of the conical disc element;
   an outer surface facing away from the axial center axis of the disc element;
   a radially inner peripheral edge;
   a radially outer peripheral edge;
   spacing members on at least one of the inner and outer surfaces for maintaining a mutual distance to an adjacent disc element, the spacing members having the shape of circumferentially distributed ribs extending from the inner peripheral edge towards the outer peripheral edge and delimiting between them flow channels for a gaseous fluid to be cleaned;
   a plurality of radial projections extending radially inwardly from the inner peripheral edge, said projections being configured such that several whole ones thereof are located between adjacent ribs, as viewed in the circumferential direction of the disc element.

9. The disc element according to claim 8, wherein the projections have a rounded free end.

10. The disc element according to claim 8, wherein the projections have a first side lying in a plane with an axial normal co-axial to the center axis and connected to the inner surface of the disc element, and a second side which likewise lies in a plane with an axial normal and connected to the outer surface of the disc element, wherein the first side of the projections is configured to be able to engage and be supported by the second side of the projections of an adjacent disc element.

11. The disc element according to claim 8, wherein the projections have first and second opposite sides which are planar, curved or sloping in a parallel manner to be able to engage each other in a stack of adjacent disc elements.

12. The disc element according to claim 11, wherein one of the projections is formed as an extension of each rib.

13. The disc element according to claim 11, wherein the ribs are formed on the inner surface of the disc element.

14. A method of using the disc element of claim 8 in forming of a rotor for a centrifugal separator for cleaning of a gaseous fluid, comprising the step of stacking a plurality of the disc elements onto a rotor core member.

* * * * *